United States Patent [19]

Tagami et al.

[11] Patent Number: 5,047,796
[45] Date of Patent: Sep. 10, 1991

[54] AUTOMATIC FOCUSING DEVICE FOR CAMERA

[75] Inventors: Sigeru Tagami; Nobuo Shinozaki; Kazuo Akimoto, all of Chiba, Japan

[73] Assignee: Seikosha Co., Ltd., Tokyo, Japan

[21] Appl. No.: 560,262

[22] Filed: Jul. 31, 1990

Related U.S. Application Data

[63] Continuation of Ser. No. 375,756, Jul. 5, 1989, abandoned.

[30] Foreign Application Priority Data

Jul. 4, 1988 [JP] Japan .................. 63-166397

[51] Int. Cl.⁵ .................. G03B 9/08; G03B 13/36
[52] U.S. Cl. .................. 354/400; 354/439
[58] Field of Search ............ 354/400, 401, 435, 439, 354/234.1, 266, 268

[56] References Cited

U.S. PATENT DOCUMENTS

| | | | |
|---|---|---|---|
| 4,348,089 | 9/1982 | Shenk | 354/401 |
| 4,634,254 | 1/1987 | Ogihara et al. | 354/234.1 X |
| 4,769,664 | 9/1988 | Namai et al. | 354/400 |
| 4,779,114 | 10/1988 | Koboyashi | 354/400 |
| 4,918,479 | 4/1990 | Inoue et al. | 354/439 X |

Primary Examiner—W. B. Perkey
Attorney, Agent, or Firm—Jordan and Hamburg

[57] ABSTRACT

An automatic focusing device for a camera having a lens, includes a camera lens focusing mechanism which adjusts the focus of the lens and which includes a rotatable driving ring, a coaxially mounted rotatable range ring and a spring which moves the range ring in correspondence with movement of the driving ring; a stepper motor which drives the driving ring so that the range ring adjusts the focus of the lens; a stepper motor driving circuit which controls the operation of the stepper motor; a home switch connected with the range ring and which determines the start of the focusing operation thereby; a shutter speed calculating circuit which calculates the shutter speed; a focusing arithmetic circuit which performs arithmetic operations for the focusing adjustment; an AF magnet sequence circuit which controls an electromagnet of the camera lens focusing mechanism to rotatably lock the range ring once the focusing operation has been completed; a main control circuit which includes software for controlling the shutter speed calculating circuit, the focusing arithmetic circuit and the AF magnet sequence circuit; and a forward/reverse rotation pulse delivering circuit which supplied respective pulse signals to the stepper motor driving circuit in response to the home switch, the shutter speed calculating circuit, the focusing arithmetic circuit and the AF magnet sequence circuit so as to ensure that the shutter is not operated when the camera lens focusing mechanism does not operate correctly.

12 Claims, 4 Drawing Sheets

AUTOMATIC FOCUSING DEVICE FOR CAMERA

This application is a continuation of application Ser. No. 375,756, filed July 5, 1989 now abandoned.

BACKGROUND OF THE INVENTION

The present invention relates generally to cameras and, more particularly, is directed to an automatic focusing device for a camera.

An automatic focusing device for use in a camera according to the prior art includes a camera lens focusing mechanism located on the side of a shutter unit of the camera. Specifically, a drive ring is rotatably mounted to a base plate disposed on the side of the shutter unit, and is driven by a stepper motor through an idle gear. According to a preset program, the stepper motor is rotated forwardly or rearwardly for focusing, exposure, or return. In response to the rotation of the stepper motor, the drive ring is rotated forwardly or rearwardly. A cam, which acts on a sector opening lever at a point outside the focusing region to open or close sectors, protrudes from the periphery of the drive ring.

A range ring drives the camera lens via a lens driving portion thereof to position the lens at the correct focal point. The range ring is rotatably mounted to the base plate in the same way as the drive ring. The range ring has a sector gear in mesh with a pinion that is integral with a ratchet wheel. Further, the range ring is biased in a clockwise direction by a range spring so as to rotate with the drive ring.

A locking lever is biased by a lever spring and is pivoted to a pin on the base plate, with an iron member coupled to one end of the lever. The lever is attracted and held to an electromagnet via the iron member. Thus, when the electromagnet is deenergized, the locking lever is rotated clockwise, and a pawl at the front end of the locking lever enters between the teeth of the ratchet wheel. As a result, the range ring is locked at the focal point.

In operation, the stepper motor is first rotated rearwardly, so that the ratchet wheel is rotated clockwise via the drive ring and the range ring, and the locking lever is pushed upward. At this time, the electromagnet is energized to hold the locking lever at a position where the teeth of the ratchet wheel are not engaged.

Then, the stepper motor is rotated forwardly to perform a focusing operation, and this rotation is transmitted to the driving ring. The range spring rotates the range ring clockwise so that the range ring follows the drive ring in rotation. The rotation of the range ring causes a scanning lever to scan a light-emitting device held by it. A light-receiving device receives the light from the light-emitting device as the light reflected from the subject. When the lens is brought into focus, the light-receiving device delivers a focus signal and provides a display of information about the distance in the viewfinder. The focus signal deenergizes the electromagnet and rotates the locking lever to the right so as to engage the ratchet wheel, to lock the range ring. Thus, the camera lens is placed in the focal position.

If the stepper motor rotates further, the drive ring turns clockwise, causing the cam portion to rotate the pin of the sector opening lever to the right. Before the pin rotates back to the left, the range ring which is controlled by the stepper motor is disconnected from the stepper motor. Then, the drive ring opens or closes the shutter in a given manner, as determined by the stepper motor, that is, the stepper motor is rotated either forwardly or rearwardly in response to phase pulses produced by a stepper motor driving circuit.

However, the aforementioned prior art automatic focusing device has no means of checking if the electric signal, or phase pulses, supplied to the stepper motor from the stepper motor driving circuit is correctly transformed into mechanical movements, that is, correct forward or rearward rotation of the motor. For example, if movement of the camera lens focusing mechanism which is governed by forward or rearward rotation of the motor is impeded by a person, the circuit controlling the stepper motor driving circuit regards the operation of the lens focusing mechanism as correct. Then, the control circuit enables a sequence of further operations including control of the shutter mechanism. As a result, the photograph is out of focus or other problems result.

SUMMARY OF THE INVENTION

Accordingly, it is an object of the present invention to provide an automatic focusing device for a camera that overcomes the aforementioned problems with the prior art.

It is another object of the present invention to provide an automatic focusing device for a camera which prevents operation of the shutter when the camera lens focusing mechanism does not operate correctly.

In accordance with an aspect of the present invention, an automatic focusing device for a camera having a lens, includes camera lens focusing means for adjusting the focus of the lens; motor means for driving the camera lens focusing means to adjust the focus of the lens; operation start means for confirming the start of the focusing operation by the camera lens focusing means; and motor drive means for controlling the motor means in response to the operation start means.

The above and other objects, features, and advantages of the present invention will become readily apparent from the following detailed description thereof which is to be read in connection with the accompanying drawings.

DETAILED DESCRIPTION OF A PREFERRED EMBODIMENT

Figure 1:
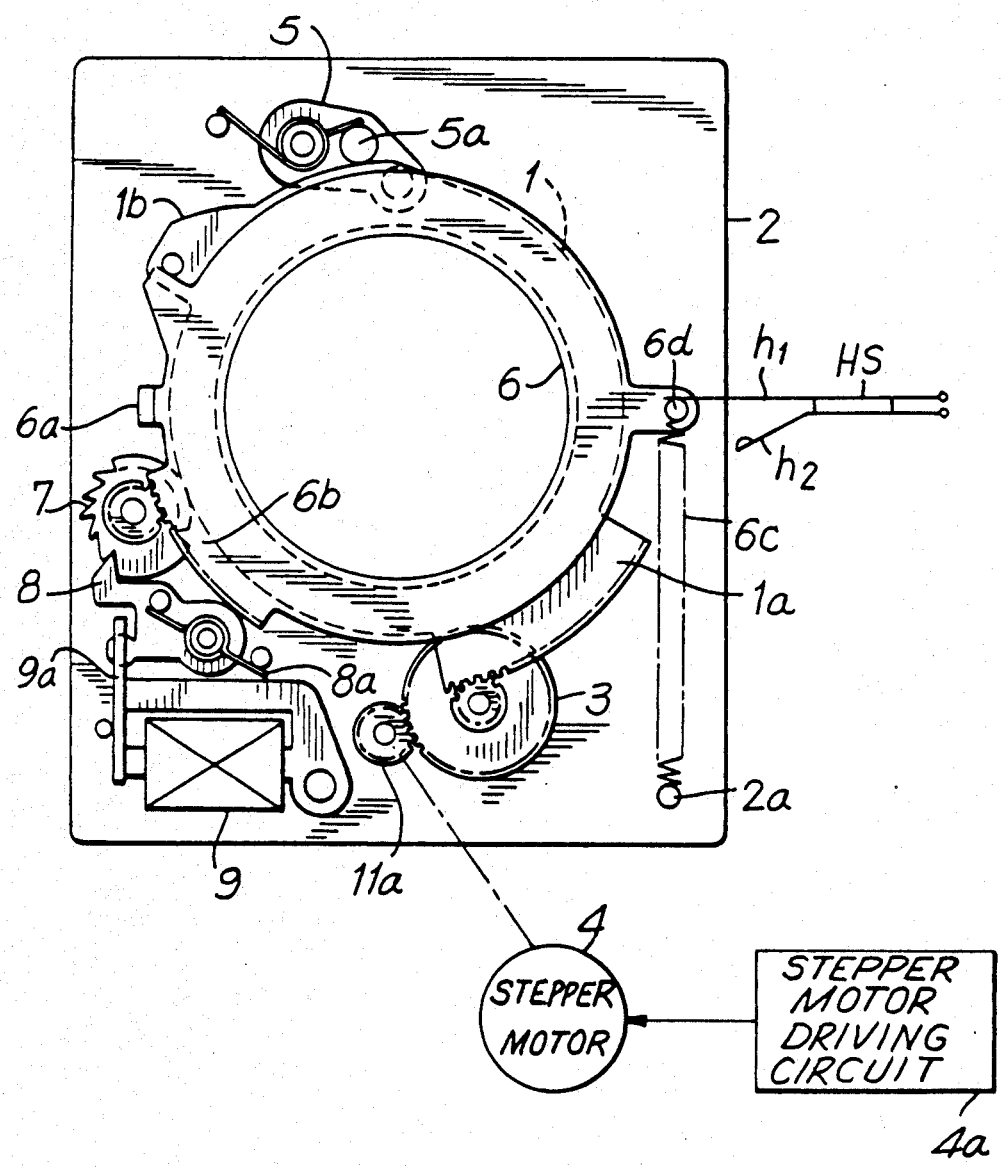
FIG. 1 is a schematic drawing of an automatic focusing device for a camera according to one embodiment of the present invention.

Referring to the drawings in detail, and initially to FIG. 4 thereof, an automatic focusing device for a camera according to the prior art will first be described. As shown therein, the prior art automatic focusing device includes a camera lens focusing mechanism located on the side of a shutter unit. Specifically, a drive ring 1 is rotatably mounted to a base plate 2 disposed on the side of the shutter unit, and is driven by a stepper motor 4 via a pinion 11a fixed to one end of stepper motor 4 and an idle gear 3 that is in mesh between pinion 11a and a sector gear 1a on the periphery of drive ring 1.

According to a preset program, stepper motor 4 is rotated forwardly or rearwardly for focusing, exposure, or return. In response to the rotation of stepper motor 4, drive ring 1 is rotated forwardly or rearwardly. Further, a cam 1b which acts on a sector opening lever 5 at a point outside the focusing region to open or close sectors (not shown) protrudes from the periphery of drive ring 1.

A range ring 6 drives the camera lens (not shown) via a lens driving portion 6a thereof to position the lens at the correct focal point. Range ring 6 is rotatably mounted to base plate 2 located on the side of the shutter unit in the same way as drive ring 1. Further, range ring 6 has a sector gear 6b in mesh with a pinion 7a that is integral with a ratchet wheel 7. Range ring 6 is also biased at all times in a clockwise direction as viewed in FIG. 4, by a range spring 6c so as to rotate with drive ring 1.

Figure 4:
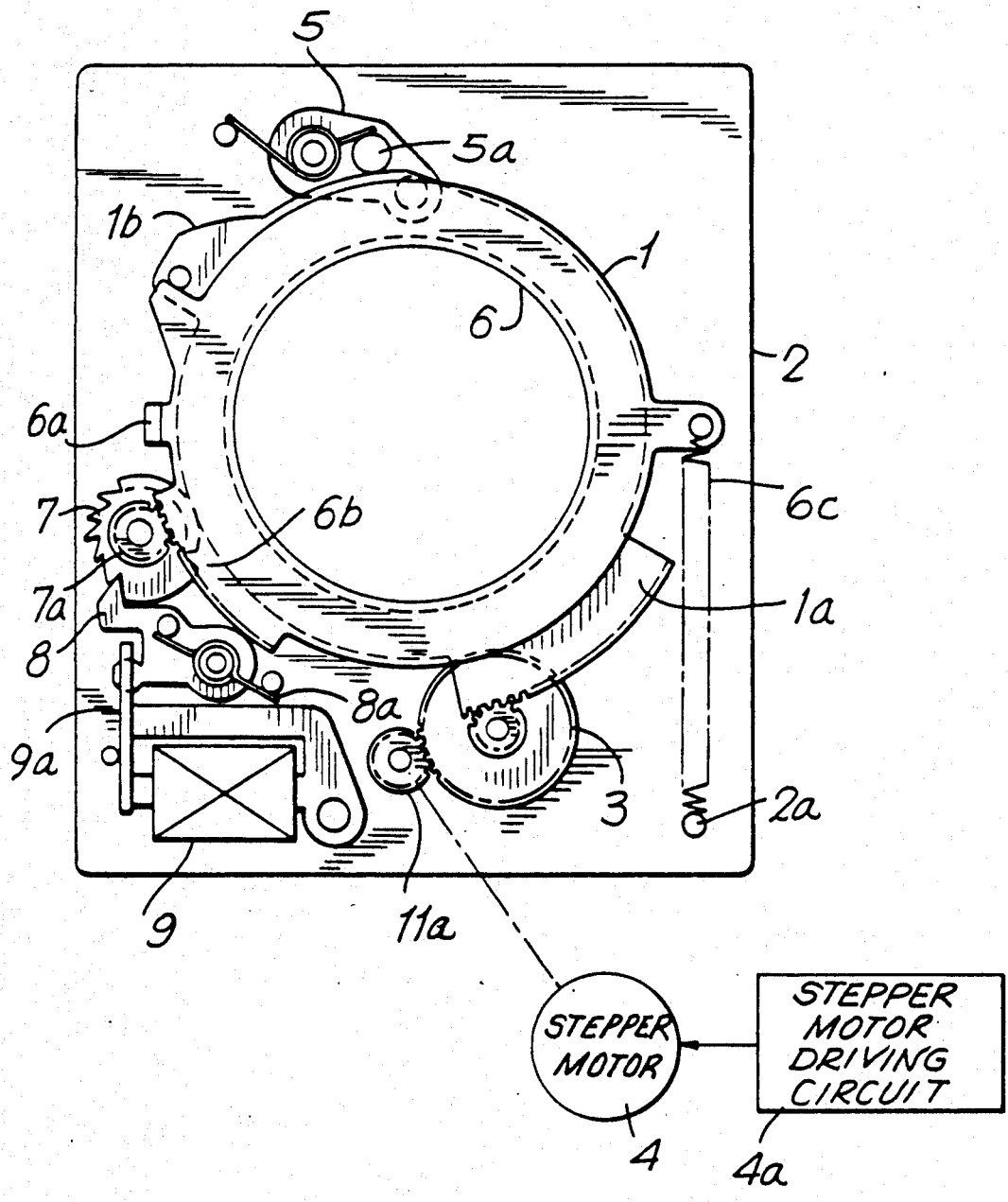
FIG. 4 is a schematic drawing of an automatic focusing device of a camera according to the prior art.

A locking lever 8 is biased to the right of FIG. 4 by a lever spring 8a and is pivoted to a pin on base plate 2, with an iron member 9a being coupled to one end of locking lever 8. Locking lever 8 is attracted and held to an electromagnet 9 via iron member 9a. Thus, when electromagnet 9 (also known as an AF magnet) is deenergized, locking lever 8 is rotated clockwise as viewed in FIG. 4, and a pawl at the front end of locking lever 8 enters between the teeth of ratchet wheel 7. As a result, range ring 6 is locked at the focal point.

In operation, stepper motor 4 is first rotated rearwardly, so that pinion 11a rotates ratchet wheel 7 clockwise via drive ring 1 and range ring 6, and locking lever 8 is pushed upward. At this time, electromagnet 9 is energized to hold locking lever 8 at a position where the teeth of ratchet wheel 7 ar not engaged.

Then, stepper motor 4 is rotated forwardly to perform a focusing operation. This rotation is transmitted to driving ring 1 via pinion 11a and idle gear 3. Accordingly, range spring 6c rotates range ring 6 clockwise as viewed in FIG. 4 so that range ring 6 follows drive ring 1 in rotation. The rotation of range ring 6 causes a scanning lever (not shown) to scan a light-emitting device held by it. A light-receiving device (not shown) receives the light from the light-emitting device as the light reflected from the subject. When the lens is brought into focus, the light-receiving device delivers a focus signal and provides a display of information about the distance in the viewfinder. The focus signal deenergizes electromagnet 9 and rotates locking lever 8 to the right so as to engage ratchet wheel 7, to lock range ring 6. Thus, the camera lens is placed in the focal position.

If stepper motor 4 rotates further, drive ring 1 turns clockwise, causing cam portion 1b to rotate pin 5a of sector opening lever 5 to the right. Before pin 5a rotates back to the left, range ring 6 which is controlled by stepper motor 4 is disconnected from stepper motor 4. Then, drive ring 1 opens or closes the shutter in a given manner, as determined by stepper motor 4, that is, stepper motor 4 is rotated either forwardly or rearwardly in response to phase pulses produced by a stepper motor driving circuit 4a.

However, as previously discussed, the prior art automatic focusing device of FIG. 4 has no means of checking if the electric signal, or phase pulses, supplied to stepper motor 4 from stepper motor driving circuit 4a, is correctly transformed into mechanical movement, that is, correct forward or rearward rotation of stepper motor 4. For example, if movement of the camera lens focusing mechanism which is governed by forward or rearward rotation of stepper motor 4 is impeded by a person, the circuit controlling stepper motor driving circuit 4a regards the operation of the lens focusing mechanism as correct. Then, the control circuit enables a sequence of further operations including control of the shutter mechanism. As a result, the photograph is out of focus or other problems result.

Figure 2:
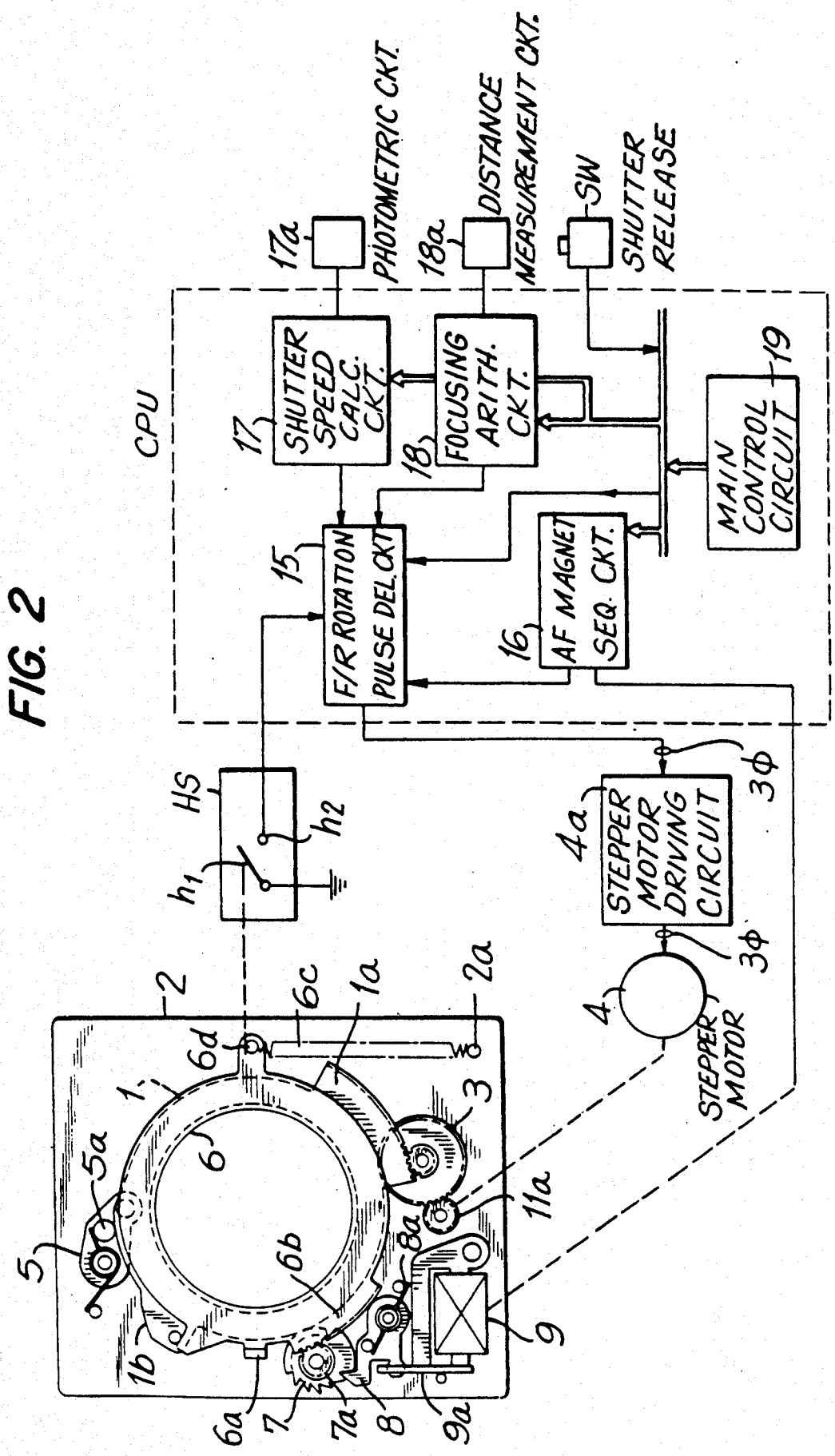
FIG. 2 is a schematic diagram of the automatic focusing device of FIG. 1 in conjunction with a block diagram or the electronic circuitry therefor.

Referring now to FIGS. 1 and 2, an automatic focusing device according to one embodiment of the present invention will now be described, in which elements corresponding to those identified with the prior art device of FIG. 4 are identified by the same reference numerals, and a detailed description of such common elements will be omitted herein for the sake of brevity.

As shown, a normally open home switch HS is connected with a pin 6d of range ring 6 and functions to produce an output signal indicating the start of an operation. Specifically, home switch HS includes a movable contact $h_1$ connected to pin 6d, and a fixed contact $h_2$. As discussed above with respect to the prior art of FIG. 4, range spring 6c biases range ring 6 in a clockwise direction at all times and, in this regard, range spring 6c is mounted between pin 6d and a pin 2a of base plate 2.

When the shutter release button (not shown) is not depressed, range ring 6 is in its home position, so that pin 6d opens home switch HS.

As shown in FIG. 2, a shutter release button SW is provided. When shutter release button SW is depressed, the first stroke or depression thereof functions to turn on the power and to drive the lens for autofocus action. In the second stroke, the film is exposed and wound up.

As described above with respect to FIG. 4, stepper motor 4 is first reversed so that pinion 11a rotates ratchet wheel 7 clockwise via drive ring 1 and range ring 6, resulting in locking lever 8 being pushed upward. At this time, electromagnet 9 is energized so that the front end of locking lever 8 is held at a position where the teeth of ratchet wheel 7 are not engaged thereby. Then, stepper motor 4 begins to rotate forward, for the focusing operation. This rotation is transmitted to drive ring 1 via pinion 11a and idle gear 3. Accordingly, range spring 6c rotates range ring 6 clockwise as viewed in FIGS. 1 and 2, so that range ring 6 follows drive ring 1.

When range ring 6 rotates clockwise as viewed in FIGS. 1 and 2, movement of pin 6d brings movable contact $h_1$ of home switch HS that is presently open into contact with fixed contact $h_2$, thus closing the circuit. As shown, movable contact $h_1$ of home switch HS is connected with a reference potential, while fixed contact $h_2$ is connected to the input of a forward/rearward rotation pulse delivering circuit 15 included in a control circuit CPU. Pulse delivering circuit 15 supplies a control signal to stepper motor driving circuit 4a to control operation of stepper motor 4. However, when home switch HS is open, pulse delivering circuit 15 is unable to deliver phase pulses to stepper motor driving circuit 4a, that is, such pulses are delivered only when home switch HS is closed. In this manner, home switch HS functions to supply an enabling signal to pulse delivering circuit 15.

The pulse signal supplied from pulse delivering circuit 15 is determined in response to output signals supplied to pulse delivering circuit 15 from an AF magnet sequence circuit 16, a shutter speed calculating circuit 17 and a focusing arithmetic circuit 18, which also form part of control circuit CPU. A photometric circuit 17a measures the brightness of the subject to be photographed and supplies a signal corresponding thereto to shutter speed calculating circuit 17, which then calculates the shutter speed from various conditions including the aperture and the film speed, along with the brightness of the subject to be photographed. A distance-measuring circuit 18a measures the distance of the camera from the subject to be photographed and supplies a signal corresponding thereto to focusing arithmetic circuit 18 which performs arithmetic operations for focusing adjustment.

In addition, an AF magnet sequence circuit 16 supplies appropriate pulses to stepper motor driving circuit 4a via forward/rearward rotation pulse delivering circuit 15 for controlling stepper motor 4.

Forward/rearward pulse delivering circuit 15, AF magnet sequence circuit 16, shutter speed calculating circuit 17 and focusing arithmetic circuit 18 all form part of control circuit CPU, which also includes a main control circuit 19 formed by read only memories (ROMs) and random access memories (RAMs) which store a program and data for controlling the operation of pulse delivering circuit 15, AF magnet sequence circuit 16, shutter speed calculating circuit 17 and focusing arithmetic circuit 18 through a bus line. In the general operation, main control circuit 19 controls the aforementioned circuitry such that three rearward pulses are supplied from pulse delivering circuit 15 to stepper motor driving circuit 4a, whereupon electromagnet 9 is operated, followed by seven pulses being supplied to stepper motor driving circuit 4a for forward rotation.

Figure 3:
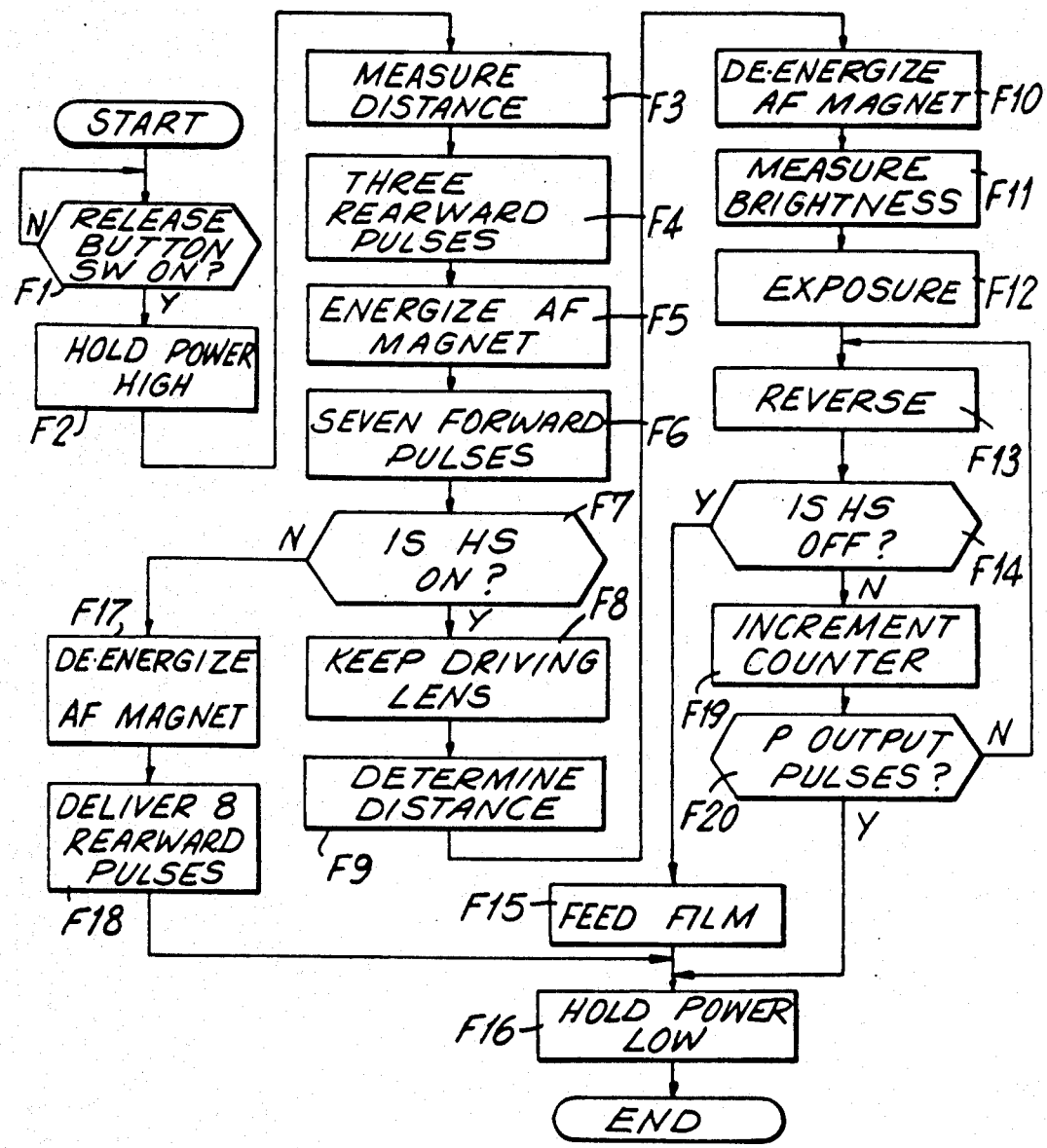
FIG. 3 is a flow-chart diagram illustrating the operation of the automatic focusing device of FIG. 2.

Referring now to FIG. 3 for the specific operation, when shutter release button SW (FIG. 2) is depressed, the sequence of operations shown in FIG. 3 is performed. Specifically, when shutter release button SW is depressed in step F1, power is turned on and thereafter, the power is held on or at a high level in step F2. Distance-measuring circuit 18a then measures the distance of the subject to be photographed from the camera, in step F3. As a result, focusing arithmetic circuit 18 performs arithmetic operations for the focusing adjustment.

Thereafter, in step F4, AF magnet sequence circuit 16 delivers three pulses for rearward rotation to stepper motor 4 via forward/rearward rotation pulse delivering circuit 15 and stepper motor driving circuit 4a. After three rearward pulses are delivered to stepper motor 4, ratchet wheel 7 is rotated to the left by drive ring 1, pushing locking lever 8 upward. In this state, AF magnet sequence circuit 16 produces a signal to operate or energize electromagnet 9 in step F5 so as to move the front end of locking lever 8 out of contact with the teeth of ratchet wheel 7. Forward/rearward rotation pulse delivering portion 15 next delivers seven forward pulses to stepper motor 4, in step F6, under the control of AF magnet sequence circuit 16. Thus, the lens is driven.

In step F7, a determination is then made as to whether home switch HS is closed or open. If home switch HS is closed, forward pulses determined by the focusing arithmetic circuit 18 are fed to stepper motor 4 via forward/rearward rotation pulse delivering circuit 15 in step F8. In step F9, the lens is then driven until a desired distance is reached, whereupon AF magnet 9 is deenergized in step F10. At this stage, locking lever 8 engages ratchet wheel 7 so as to lock range ring 6. At this time, the camera is correctly focused.

When the shutter release button SW is depressed a second time, photometric circuit 17a measures the brightness of the subject in step F11. Shutter speed calculating circuit 17 then calculates the shutter speed from various conditions including the aperture and the film speed, in response to photometric circuit 17a. Accordingly, stepper motor 4 is controlled by forward or rearward pulses supplied thereto according to the results of the calculation of the shutter speed. Since AF magnet 9 is deenergized, drive ring 1 is under the control of stepper motor 4 and the exposure operation determined by shutter speed calculating circuit 17 is carried out in step F12. After the exposure operation is performed, rearward pulses are supplied to stepper motor 4 via forward/rearward rotation pulse delivering circuit 15 under the control of main control circuit 19 in step F13, whereupon range ring 6 returns to its home position.

At this time, a determination is made as to whether home switch HS is open or closed. If it is open, the film is wound up in step F15, and the power is turned off or to a low level in step F16.

Referring back to step F7, if home switch HS is not closed after the seven forward pulses are supplied, then AF magnet 9 is immediately deenergized in step F17, and eight rearward pulses are delivered to stepper motor 4 to return range ring 6 to its home position in step F18, whereupon the power is turned off in step 16. Accordingly, an incorrect photograph taking operation is prevented, that is, the shutter is not actuated.

Referring back to step F14, if range ring 6 is not returned to its home position, then rearward pulses are again delivered at steps F19 and F20 until range ring 6 is returned to its home position. This ensures that, during the next operation, the film is correctly wound.

Thus, with the present invention, the state of operation of the mechanical system which is controlled by the electronic circuitry of FIG. 2 is fed back to such electronic circuitry by means of home switch HS. As a result, the sequence of operations, including the exposure and the winding of the film, is prevented from being started incorrectly.

It will be appreciated that various modifications can be made to the present invention. For example, although home switch HS is normally open, a normally closed switch can be used in place thereof. In addition, although home switch HS includes mechanical contacts, the switch is not limited to this structure and may be fabricated from a logic circuit comprised of semiconductor devices. Further, although a stepper motor has been employed as the powering means, other motors, such as an ultrasonic motor, a DC motor having an encoder or the like can be used.

Having described a specific preferred embodiment of the invention with reference to the accompanying drawings, it will be appreciated that the present invention is not limited to that precise embodiment, and that various changes and modifications can be effected therein by one of ordinary skill in the art without departing from the spirit or scope of the invention as defined by the appended claims.

What is claimed is:

1. An automatic focusing device for a camera having a lens, said device comprising:
   means providing a camera release signal;
   camera lens focusing means for adjusting the focus of the lens;

motor lens for driving said camera lens focusing means to adjust the focus of the lens during a focusing operation and for subsequently controlling the performance of an exposure operation;

operation start means for providing a start signal confirming the start of the focusing operation by said camera lens focusing means between the time of said camera release signal and the next occurring exposure operation; and motor drive means responsive to a camera release signal for controlling said motor means to start a sequence of a focusing operation and a subsequent exposure operation and for inhibiting said exposure operation in the absence of a start signal from said operation start means following said last mentioned camera release signal.

2. An automatic focusing device according to claim 1, wherein said operation start means includes switch means for detecting a home position of said camera lens focusing means, said switch means being connected with said camera lens focusing means.

3. An automatic focusing device according to claim 2, wherein said camera lens focusing means includes ring means for adjusting the focus of the lens, said ring means being driven in rotation by said motor means, and said switch means is connected with said ring means.

4. An automatic focusing device according to claim 3, wherein said ring means includes a driving ring driven by said motor means and a coaxially arranged range ring, and said camera lens focusing means further includes biasing means for rotatably driving said range ring in correspondence with rotation of said driving ring so as to adjust the focus of the lens.

5. An automatic focusing device according to claim 4, wherein said biasing means includes a spring connected between a frame and said range ring.

6. An automatic focusing device according to claim 2, wherein said operation start means further includes rotation pulse delivering means for supplying a pulse signal to said motor drive means in response to said switch means.

7. An automatic focusing device according to claim 6, wherein said operation start means further includes focusing arithmetic means for supplying a focusing signal to said rotation pulse delivering means in response to the distance of the camera from a subject to be photographed, an AF magnet sequence means for supplying a signal to said rotation pulse delivering means· and main control means for controlling operation of said focusing arithmetic means and said AF magnet sequence means.

8. An automatic focusing device for a camera having a lens, said device comprising:

camera lens focusing means for adjusting the focus of the lens;

motor means for driving said camera lens focusing means to adjust the focus of the lens;

operation start means for confirming the start of the focusing operation by said camera lens focusing means;

motor drive means for controlling said motor means in response to said operation start means;

said operation start means including:

switch means for detecting a home position of said camera lens focusing means, said switch means being connected with said camera lens focusing means, rotation pulse delivering means for supplying a pulse signal to said motor drive means in response to said switch means, focusing arithmetic means for supplying a focusing signal to said rotation pulse delivering means in response to the distance of the camera from a subject to be photographed, an AF magnet sequence means for supplying a signal to said rotation pulse delivering means, and main control means for controlling operation of said focusing arithmetic means and said AF magnet sequence means;

wherein said rotation pulse delivering means supplies a rearward pulse signal to said motor drive means to move said motor means in a rearward direction by a predetermined amount in response to said AF magnet sequence means, followed by a forward pulse signal for moving said motor means in a forward direction by a second predetermined amount in response to said AF magnet sequence means, whereupon said rotation pulse delivering means supplies a further pulse signal only when said switch means indicates the start of the focusing operation and by a predetermined amount determined by said focusing arithmetic means.

9. An automatic focusing device according to claim 8, wherein the camera further includes a shutter movable between an open and closed position, and said operation start means further includes shutter speed calculating means for calculating the shutter speed and for supplying a shutter speed signal to said rotation pulse delivering means which supplies a pulse signal to said motor drive means to control operation of said shutter.

10. An automatic focusing device for a camera having a lens, said device comprising:

means providing a camera release signal;

camera lens focusing means for adjusting the focus of the lens;

stepping motor means for driving said camera lens focusing means to adjust the focus of the lens during a focusing operation and for subsequently controlling the performance of an exposure operation;

operation start means for providing a start signal confirming the start of the focusing operation by said camera lens focusing means between the time of said camera release signal and the next occurring exposure operation; and motor drive means responsive to a camera release signal for applying a sequence of pulses to said motor means to start a sequence of a focusing operation and a subsequent exposure operation and for inhibiting said exposure operation in the absence of a start signal from said operation start means within the period of a predetermined number of pulses of said sequence following said last mentioned camera release signal.

11. An automatic focusing device for a camera having a lens, said device comprising:

means providing a camera release signal;

camera lens focusing means for adjusting the focus of the lens;

motor means for driving said camera lens focusing means to adjust the focus of the lens during a focusing operation and for subsequently controlling the performance of an exposure operation;

operation start means for providing a start signal confirming the start of the focusing operation by said camera lens focusing means between the time of said camera release signal and the next occurring exposure operation; and motor drive means responsive to a camera release signal for controlling said motor means to start a sequence of said focusing operation and a subsequent exposure operation, said motor drive means comprising means for energizing said motor in response to said camera release signal, and means for deenergizing said motor in the absence of a start signal from said operation start means upon the occurrence of a predetermined condition in said sequence following said last mentioned camera release signal.

12. The automatic focusing device of claim 11 wherein said motor is a stepping motor, said motor drive means comprises means for applying stepping pulses to said motor, and said predetermined condition is the occurrence of a predetermined number of pulses following a camera release signal.

* * * * *